(12) United States Patent
Bergman et al.

(10) Patent No.: US 8,262,252 B2
(45) Date of Patent: Sep. 11, 2012

(54) ILLUMINATION SYSTEM

(75) Inventors: Anthonie Hendrik Bergman, Eindhoven (NL); Hubertus Maria Rene Cortenraad, Maastricht (NL); Siebe Tjerk De Zwart, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 629 days.

(21) Appl. No.: 11/995,015

(22) PCT Filed: Jul. 10, 2006

(86) PCT No.: PCT/IB2006/052323
§ 371 (c)(1),
(2), (4) Date: Jan. 8, 2008

(87) PCT Pub. No.: WO2007/007271
PCT Pub. Date: Jan. 18, 2007

(65) Prior Publication Data
US 2010/0061090 A1 Mar. 11, 2010

(30) Foreign Application Priority Data
Jul. 13, 2005 (EP) .................................... 05106395

(51) Int. Cl.
*B60Q 1/26* (2006.01)
*F21V 1/00* (2006.01)

(52) U.S. Cl. ........ 362/237; 362/232; 362/235; 362/236; 362/244; 362/331

(58) Field of Classification Search .................... None
See application file for complete search history.

(56) References Cited

U.S. PATENT DOCUMENTS

| | | | |
|---|---|---|---|
| 6,474,837 B1 | 11/2002 | Belliveau | |
| 6,502,956 B1 | 1/2003 | Wu | |
| 7,543,941 B2 * | 6/2009 | Holder et al. | .................. 353/43 |
| 2002/0176250 A1 | 11/2002 | Bohler et al. | |
| 2003/0117797 A1 | 6/2003 | Sommers et al. | |
| 2003/0147237 A1 | 8/2003 | Halasz | |
| 2003/0193799 A1 | 10/2003 | Bohler | |
| 2004/0012945 A1 | 1/2004 | Yamashita et al. | |
| 2004/0240217 A1 | 12/2004 | Rice | |

FOREIGN PATENT DOCUMENTS

EP 0905439 A2 3/1999

(Continued)

*Primary Examiner* — Diane Lee
*Assistant Examiner* — Sean Gramling
(74) *Attorney, Agent, or Firm* — Mark L. Beloborodov

(57) ABSTRACT

The illumination system has an array of light sources (1, 1', ... ) such as an array of light emitting diodes arranged in a pre-determined manner in a first plane (11), wherein $d_{source}$ is a characteristic dimension of the spatial arrangement of the light sources in the first plane. An array of associated lenses (2, 2', ... ) is arranged in substantially the same pre-determined manner in a second plane (12). Each lens has substantially the same focal distance $f_{lens}$. The array of lenses is provided at a plane distance $d_{plane}$ from the array of light sources. The plane distance $d_{plane}$ is substantially equal to the focal distance $f_{lens}$ of the lenses. The illumination system has displacement means for displacing the array of lenses with respect to the array of light sources so as to obtain a plurality of directional light beams projecting spots on a projection plane arranged at a projection distance $d_{projection}$ from the illumination system, wherein $d_{projection} \geq 10 \times d_{source}$ and $d_{projection} \geq 10 \times d_{plane}$.

11 Claims, 5 Drawing Sheets

FOREIGN PATENT DOCUMENTS

| | | |
|---|---|---|
| EP | 1548357 A1 | 6/2005 |
| WO | 9930537 | 6/1999 |
| WO | 0024062 | 4/2000 |
| WO | 2004047498 | 6/2004 |
| WO | 2005093319 | 10/2005 |

* cited by examiner

ILLUMINATION SYSTEM

FIELD OF THE INVENTION

The invention relates to an illumination system comprising an array of light sources and an array of associated lenses.

BACKGROUND OF THE INVENTION

Such illumination systems are known per se. They are used, inter alia, for general lighting purposes, such as spot lights, flood lights and for large-area direct-view light-emitting panels applied, for instance, in signage, contour lighting, and billboards. Furthermore, the illumination systems are used as task light.

Generally, such illumination systems comprise a multiplicity of light sources, for instance, light-emitting diodes (LEDs). LEDs may be light sources of distinct primary colors, such as, for example, the well-known red (R), green (G), or blue (B) light emitters. In addition, the light emitter may have, for example, amber (A), magenta or cyan as primary colors. These primary colors may be either generated directly by the light-emitting diode chip, or by a phosphor upon irradiance with light of a shorter wavelength (e.g. green, blue or UV-light) from the light-emitting diode chip. In the latter case, also the use of mixed colors or white light is possible as one of the primary colors. Generally, the light emitted by the individual light sources is mixed so as to obtain a uniform distribution of the light while eliminating the correlation of the light emitted by the illumination system with a specific light source.

U.S. Pat. No. 6,502,956 discloses an illumination system including a housing, a circuit board mounted to the housing, an electric connector attached to the housing and electrically connected to the circuit board, a plurality of light-emitting diodes (LEDs) mounted to the circuit board that are activated to emit a light output when an electric voltage is applied to the electric connector, and a plurality of LED covers each mounted to cover one of the plurality of LEDs. Each LED cover includes a lens portion that redirects the light output from the one LED, and a side portion that attaches to either the PCB or the LED to secure the LED cover in place. The LED covers may be individually movable or can be replaced so as to modify the overall distribution pattern of the LED lamp.

The known illumination system has the drawback that the illumination system has a relatively complicated construction.

OBJECT AND SUMMARY OF THE INVENTION

The invention has for its object to eliminate the above-mentioned drawback wholly or partly. According to the invention, this object is achieved by an illumination system comprising:

an array of light sources arranged in a pre-determined manner in a first plane, wherein $d_{source}$ is a characteristic dimension of the spatial arrangement of the light sources in the first plane, an array of associated lenses arranged in substantially the same pre-determined manner in a second plane, each lens having substantially the same focal distance $f_{lens}$, the second plane being arranged substantially parallel to the first plane, the array of lenses being provided at a plane distance $d_{plane}$ from the array of light sources, the plane distance $d_{plane}$ being substantially equal to the focal distance $f_{lens}$ of the lenses, the illumination system further comprising displacement means for displacing the array of lenses with respect to the array of light sources parallel to the first plane so as to obtain a plurality of directional light beams projecting spots on a projection plane arranged at a projection distance $d_{projection}$ from the illumination system, wherein $d_{projection} \geq 10 \times d_{source}$ and $d_{projection} \geq 10 \times d_{plane}$.

The illumination system according to the invention comprises a new type of light fixture and a relatively thin luminaire that emits a plurality of directional light beams or, under certain conditions, one relatively small bundle of light beams. Displacement of the array of lenses in the second plane influences the direction of the light beam or beams or influences the size of the spot.

Known illumination systems in which the light spot can be re-directed are relatively bulky systems and the direction of the light beam emitted by the known illumination system is controlled by mechanically tilting the lamp fixture. Alternatively, spotlights emitting very small beams are normally equipped with a lens, but this lens is only used to limit the beam shape: the complete illumination system has to be re-oriented for obtaining a change in direction of the light beam.

The inventors have had the insight to arrange a plurality of light sources in a pre-determined manner in a first plane while an array of associated lenses is arranged in substantially the same pre-determined manner in a second plane and to displace the second plane with respect to the first plane. By arranging the array of lenses at a pre-determined distance from the array of light emitters, which plane distance is substantially equal to the focal distance of the lenses, each lens generates a substantially parallel beam of light. If a light source is substantially at the focal point of the associated lens, a spot is obtained substantially upright from the illumination system (perpendicular with respect to the first or the second plane). The light beams of each combination of a particular light source and a particular associated lens project a spot or a plurality of spots on a projection plane (e.g. a ceiling of a room). If the array of lenses is displaced with respect to the array of light sources, the light beams will change direction. This change of direction of the light beams results in a shift of the spot or spots on the projection plane, while the illumination system is not re-oriented or tilted. As a result, a relatively thin illumination system is obtained, which has a movable spot without mechanically tilting the illumination system itself.

The illumination system according to the invention presents another advantage when the light sources and lenses are arranged in such a way that a single spot is created, the single spot comprising an overlap of the spots produced by each combination of a particular light source and a particular associated lens. In other words, a single spot is created by coinciding individual spots. If, in this configuration, the lens array is rotated through a certain relatively small angle and the spots no longer coincide, this will result in a larger spot. If the lens array is rotated too much with respect to the light sources, the spots will split up. Continuous rotational movement of the array of lenses with respect to the array of light sources results in the creation of a so-called disco lamp effect. This is realized by an illumination system which is relatively simple, relatively easy to manufacture, relatively easy to use and, in addition, relatively inexpensive. Movement of the spots emitted by the illumination system according to the invention is accomplished without tilting or reorienting the illumination system. Under all circumstances, a relatively flat and thin directional illumination system is obtained.

The displacement means provide a translational displacement or a rotational displacement of the array of lenses with respect to the array of light sources. In order to avoid any undesired effects occurring in the vicinity of the illumination system, the projection distance is chosen to be at least 10 times the characteristic dimension $d_{source}$ of the spatial arrangement of the light sources in the first plane and at least 10 times the distance $d_{plane}$ between the first and the second plane.

The illumination system according to the invention is simple, relatively easy to manufacture, relatively easy to use and, in addition, relatively inexpensive. Displacement of the light beams emitted by the illumination system according to the invention is accomplished without tilting or reorienting the illumination system. Under all circumstances, a relatively flat directional illumination system is obtained.

Preferably, $d_{lens} \leq d_{source}$, wherein $d_{lens}$ is a characteristic dimension of the spatial arrangement of the lenses. By choosing the distances between the lenses to be substantially equal to or smaller than the distances between the light sources, the spots on the projection plane tend to overlap. When the distances between the lenses are chosen to be larger than the distances between the light sources, the spots on the projection plane will never overlap.

A preferred embodiment of the illumination system according to the invention is characterized in that the ratio of the characteristic dimension of the spatial arrangement of the light sources in the first plane and the characteristic dimension of the spatial arrangement of the lenses in the second plane meets the relation:

$$d_{source} = d_{lens} \times \left(1 + \frac{d_{plane}}{d_{projection}}\right).$$

By arranging the light sources at a (slightly) larger distance with respect to each other than the lenses, the light beams emitted by the illumination system will overlap to form a single spot on the projection plane. In general, the projection distance $d_{projection}$ from the illumination system to the projection plane is at least 10 times larger than the distance $d_{plane}$ between the first and the second plane.

The light sources and lenses are preferably arranged in a hexagonal structure. This arrangement yields a compact illumination system. In addition, lenses in a hexagonal array are manufactured as standard structures, for instance, as sheets with lenses. This further lowers the cost of the illumination system.

One favorable embodiment of the displacement means is the provision of a translational displacement of the array of lenses with respect to the array of light sources. To this end, a preferred embodiment of the illumination system according to the invention is characterized in that the displacement means are constructed for translational displacement of the array of lenses so as to obtain a joint translational displacement of the spots. A small displacement of the array of lenses results in a joint displacement of the spots on the projection plane. The translational displacement preferably comprises a position in which a lens optical axis of at least one of the lenses coincides with a source optical axis of at least one of the light sources so as to obtain substantially coinciding spots on the projection plane, the translational displacement of the array of lenses causing a corresponding displacement of the coinciding spots, the lens optical axis and the source optical axis being perpendicular to the second and the first plane, respectively. In this preferred embodiment, the lenses are arranged with respect to the light sources in such a way that the spots coincide to form a single spot, the single spot being displaced along the projection plane while the array of lenses is under translational displacement. Alternatively, a single spot can be obtained when the optical axes of all lenses have been displaced in a certain direction with the same distance with respect to the optical axes of all light sources: in this situation, a single spot will be projected which is displaced along the same direction.

Another favorable embodiment of the displacement means is the provision of a translational displacement of the array of lenses with respect to the array of light sources. To this end, a preferred embodiment of the illumination system according to the invention is characterized in that the displacement means are constructed for rotational displacement of the array of lenses so as to obtain a rotational displacement of the spots, the angles of the light beams with respect to an axis perpendicular to the second plane changing upon rotation.

The rotational displacement preferably comprises a position in which a lens optical axis of at least one of the lenses coincides with a source optical axis of at least one of the light sources so as to obtain substantially coinciding spots on the projection plane, the rotational displacement of the array of lenses causing an enlargement of the area occupied by the coinciding spots. In this preferred embodiment, the lenses are arranged with respect to the light sources in such a way that the spots coincide to form a single spot, the single spot broadening (and weakening) on the projection plane while the array of lenses is under rotational displacement. In fact, the individual spots no longer project at substantially the same place, but tend to split up into individual spots. If the array of lenses is rotated too far from the "ideal" position, it is observed that individual spots are projected on the projection plane.

The array of lenses preferably comprises an array of Fresnel lenses. Plates comprising a plurality of Fresnel lenses, for instance, stacked hexagonally, are produced on a large scale.

In a favorable embodiment of the illumination system, the array of light sources comprises an array of light-emitting diodes. The array of light-emitting diodes preferably comprises a plurality of light-emitting diodes of different primary colors.

In the illumination system according to the invention, the array of light sources may also be an array of secondary light sources. To this end, a preferred embodiment of the illumination system according to the invention is characterized in that the array of light sources comprises an array of light-outcoupling structures arranged in a light guide, the light guide being provided with at least one primary source of light.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Notably, some dimensions are shown in a strongly exaggerated form for the sake of clarity. Similar components in the Figures are denoted as much as possible by the same reference numerals.

DESCRIPTION OF EMBODIMENTS

Figure 1A:
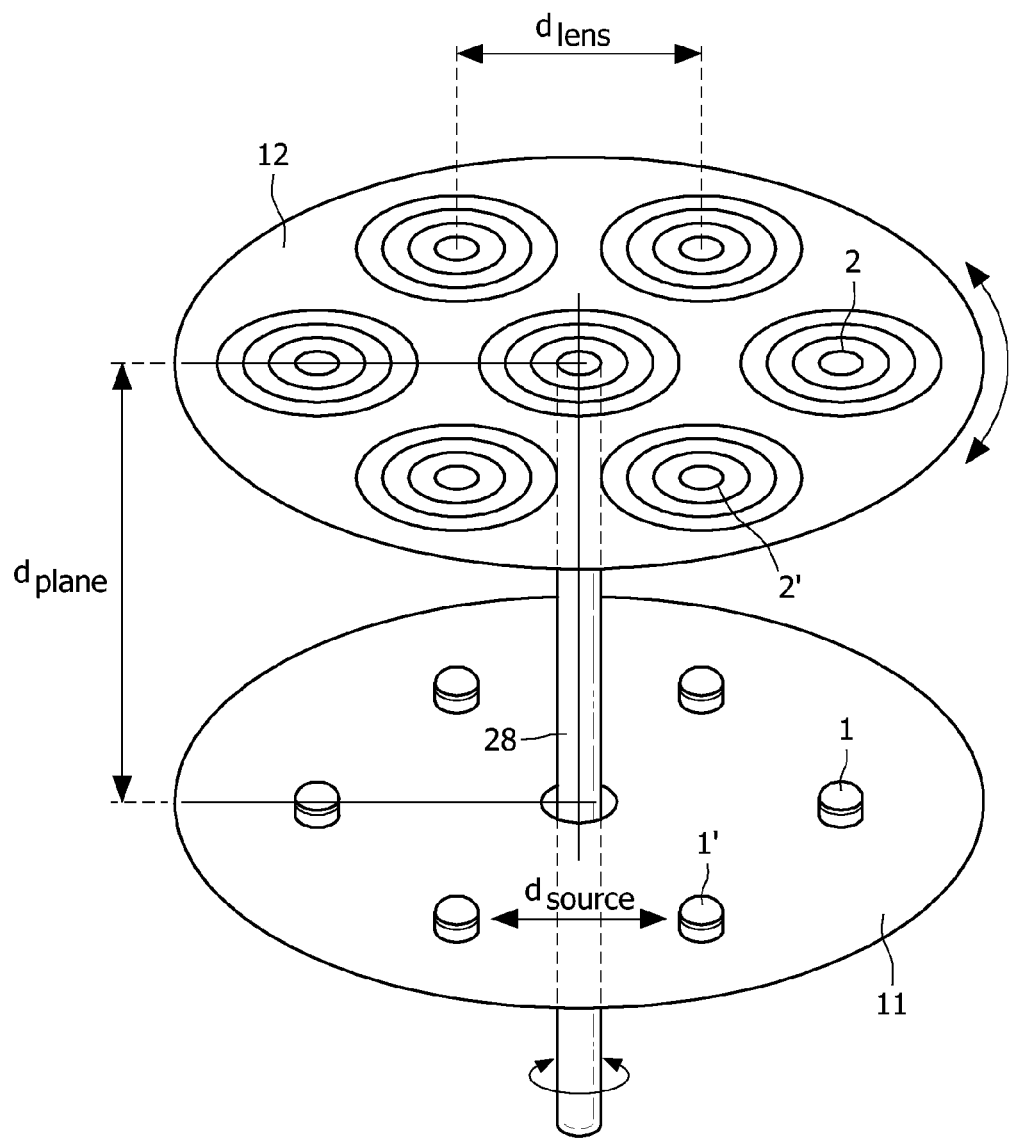
FIG. 1A is a perspective view of an embodiment of the illumination system according to the invention.
Figure 1B:
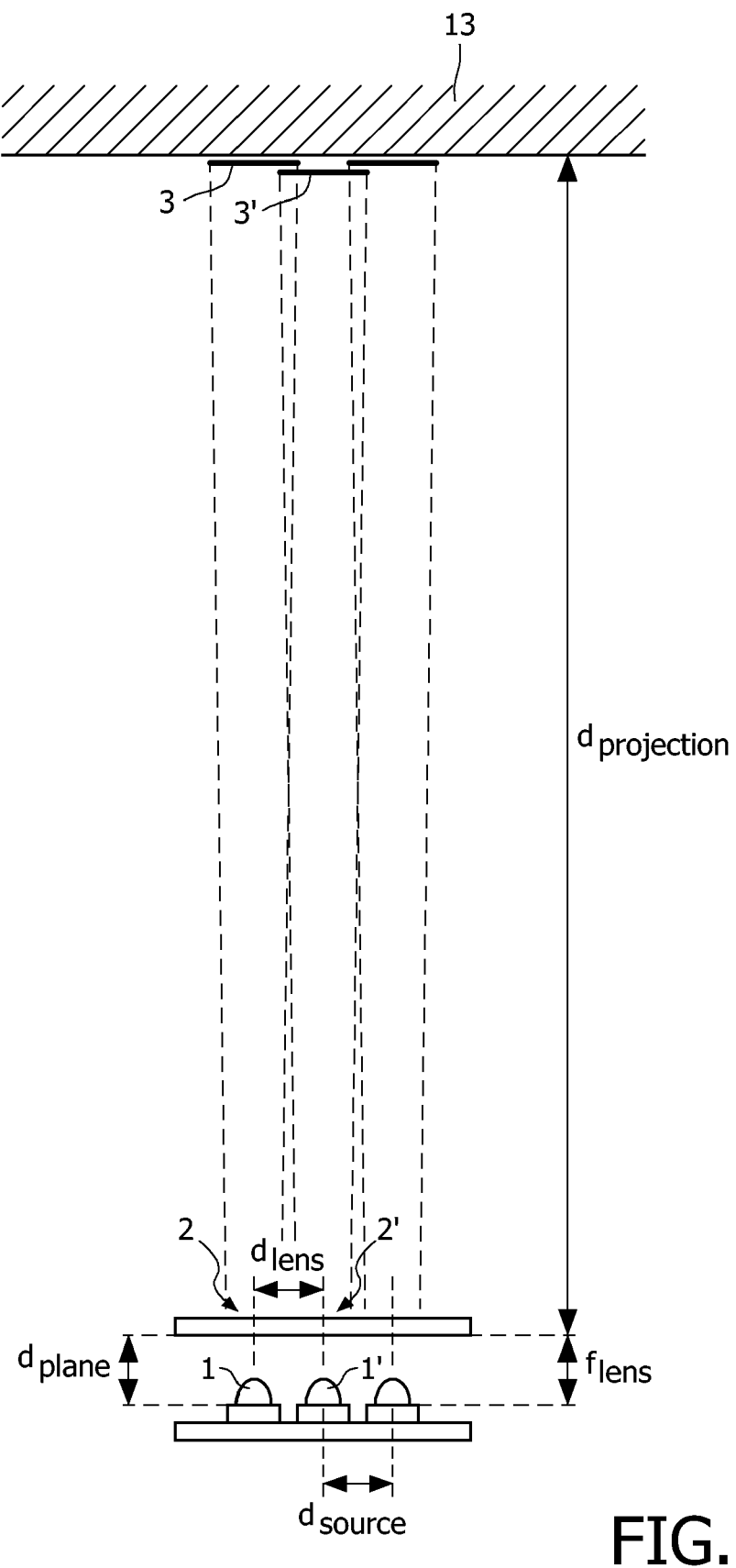
FIG. 1B is a side view of the embodiment of the illumination system as shown in FIG. 1A.

FIG. 1A is a perspective view of an embodiment of the illumination system according to the invention. In addition, FIG. 1B is a side view of the embodiment of the illumination system as shown in FIG. 1A. The illumination system comprises an array of light sources 1, 1', . . . arranged in a pre-determined manner in a first plane 11. In the example of FIG. 1A, the light sources 1, 1', . . . are arranged in a hexagonal structure. The distance between the light sources 1, 1', . . . is indicated as $d_{source}$, $d_{source}$ representing a characteristic dimension of the spatial arrangement of the light sources 1, 1', . . . in the first plane 11. In the example of FIG. 1A, the light sources are light-emitting diodes (LEDs). LEDs may be light sources of distinct primary colors such as, for example, the well-known red, green, blue and amber LEDs. Alternatively, the light emitter may have, for example, cyan as a primary color. The primary colors may be either generated directly by the LED chip, or by a phosphor upon irradiance with light from the LED chip. In the latter case, also mixed colors or white light may act as one of the primary colors of the illumination system. LEDs have a light emission pattern which deviates from other light sources. In general, a LED emits light in a half hemispherical part of space: all the light at the location of the LED chip is directed away from the face of the LED chip. In addition, LEDs have a relatively high source brightness. Heat generated by the LEDs can be readily dissipated by heat conduction via the PCB. In a favorable embodiment of the illumination system, the (metal-core) printed circuit board is in contact with a housing of the illumination system via a heat-conducting connection (not shown in FIG. 1A).

In the illumination system shown in FIGS. 1A and 1B, an array of associated lenses 2, 2', . . . is arranged in substantially the same pre-determined manner in a second plane 12. In the example of FIG. 1A, the lenses 2, 2', . . . are arranged in the same hexagonal structure as the light sources 1, 1', . . . . The distance between the lenses 2, 2', . . . is indicated in FIG. 1A as $d_{lens}$, $d_{lens}$ representing a characteristic dimension of the spatial arrangement of the lenses 2, 2', . . . in the second plane 12. Each lens 2, 2', . . . has substantially the same focal distance $f_{lens}$ (see FIG. 1B). The second plane 12 is arranged substantially parallel to the first plane 11. In FIGS. 1A and 1B, $d_{plane}$ is the distance between the first plane 11 and the second plane 12. The plane distance $d_{plane}$ is substantially equal to the focal distance $f_{lens}$ of the lenses 2, 2', . . . . If the light sources 1, 1', . . . are regarded as point sources, a substantially parallel light beam is emitted by the illumination system, if the array of lenses 2, 2', . . . is positioned at the focal distance from the light sources 1, 1', . . . ; in FIG. 1B a number of light beams emitted by the illumination system have been indicated schematically. The distance $d_{lens}$ between the lenses 2, 2', . . . is preferably chosen to be smaller than or equal to the distance $d_{source}$ between the light sources 1, 1', . . . .

In the example of FIG. 1, the array of lenses 2, 2', . . . comprises an array of Fresnel lenses. Plates comprising a plurality of Fresnel lenses, for instance, stacked hexagonally, are commercially available. In the example shown in FIGS. 1A and 1B, the mutual distance between the lenses 2, 2', . . . is approximately 2 cm, each lens 2, 2', . . . having a focal distance $f_{lens}$ of approximately 2 cm. In the example of FIG. 1A, a "central" lens is shown. This central lens is present because the second plane 12 is a regular arrangement of equally spaced lenses.

In the example of FIG. 1B, it can be seen that a plurality of substantially parallel, directional light beams is obtained, which project spots 3, 3', . . . on an (imaginary) projection plane 13. The projection plane 13 may be a ceiling or a wall of a room or a suitable projection screen, or the like. For the sake of clarity, individual spots 3, 3', . . . projected on the projection plane 13 have been indicated in FIG. 1B. It can be seen that the spots 3, 3', . . . partly overlap in the example of FIG. 1B; depending on the conditions in the illumination system, a viewer may observe a "single" spot 30 (see FIG. 3A) whereas, in fact, the single spot comprises a plurality of at least substantially overlapping spots 3, 3', . . . . The (imaginary) projection plane 13 is arranged at a projection distance $d_{projection}$ from the illumination system, wherein $d_{projection} \geq 10 \times d_{source}$ and $d_{projection} \geq 10 \times d_{plane}$. Due to the relatively large distance between the illumination system and the projection plane 13, the spots 3, 3', . . . tend to broaden as compared with the size of the lenses 2, 2', . . . .

The ratio of the distance $d_{source}$ between the light sources 1, 1', . . . in the first plane 11 and the distance $d_{lens}$ between the lenses 2, 2', . . . in the second plane 12 preferably meets the following relation:

$$d_{source} = d_{lens} \times \left(1 + \frac{d_{plane}}{d_{projection}}\right).$$

By arranging the light sources 1, 1', . . . at a (slightly) larger distance with respect to each other than the lenses 2, 2', . . . , the light beams emitted by the illumination system will overlap to form a single spot 30 (see FIG. 3A) on the projection plane 13.

The illumination system according to the invention further comprises displacement means for displacing the array of lenses 2, 2', . . . with respect to the array of light sources 1, 1', . . . parallel to the first plane 11. In the example of FIG. 1A, the displacement means are constructed for rotational displacement of the array of lenses 2, 2', . . . with respect to the array of light sources 1, 1', . . . . In an alternative embodiment, the array of light sources is displaced while the array of lenses is not displaced. In the example of FIG. 1A, a rotational spindle 28 rigidly attached to the second plane 12 provides the rotational displacement. The rotational spindle 28 passes through a central hole in the first plane 11 for connection to a motor (not shown in FIG. 1A) or another suitable driving means for driving the rotational spindle 28 and the second plane 12 with the array of lenses 2, 2', . . . . The rotational direction is indicated by the arrow in FIG. 1A. By rotating the array of lenses 2, 2', . . . with respect to the array of light sources 1, 1', . . . a rotational displacement of the spots 3, 3', . . . is obtained. Upon rotation, the angles of the light beams change with respect to an axis perpendicular to the second plane 12.

The rotational displacement preferably comprises a position in which a lens optical axis of at least one of the lenses coincides with a source optical axis of at least one of the light sources 1, 1', . . . so as to obtain substantially coinciding spots 3, 3', . . . on the (imaginary) projection plane 13, the rotational displacement of the array of lenses 2, 2', . . . causing an enlargement of the area occupied by the coinciding spots 3, 3', . . . (see FIG. 3C). In this configuration, the lenses 2, 2', . . . are arranged with respect to the light sources 1, 1', . . . in such a way that the spots 3, 3', . . . coincide to form a single spot 30 (see FIG. 3A), the spots broadening to form a broadened (and weakened) single spot 30' (see FIG. 3C) on the projection 13 plane while the array of lenses 2, 2', . . . is under rotational displacement. In fact, the individual spots 3, 3', . . . no longer project at substantially the same place, but tend to split up into individual spots. If the array of lenses is rotated too far from the "ideal" position, it is observed that individual spots 3, 3', . . . are projected on the projection plane 13. Further displacement or continuous rotation of the array of lenses 2, 2', . . . with respect to the array of light sources 1, 1', . . . results in each of the spots projecting their own orbit on the projection plane 13. At a certain position of the array of lenses 2, 2', . . . with respect to the array of light sources 1, 1', . . . the spots 3, 3', . . . will regain their form as a single spot 30. Continuous rotational movement of the array of lenses 2, 2', . . . with respect to the array of light sources 1, 1', . . . results in the creation of a so-called disco lamp effect. In a "disco" version of the illumination system, a somewhat larger distance $d_{plane}$ between the array of light sources and the array of lenses is an advantage, because some of the light emitted by a light source is then projected via two or more lenses, resulting in so-called secondary spots on the projection plane. These secondary spots enhance the disco lamp effect. This is realized by an illumination system which is relatively simple, relatively easy to manufacture, relatively easy to use and, in addition, relatively inexpensive. Movement of the spots emitted by the illumination system according to the invention is accomplished without tilting or reorienting the illumination system. Under all circumstances, a relatively flat and small directional illumination system is obtained.

Figure 2A:
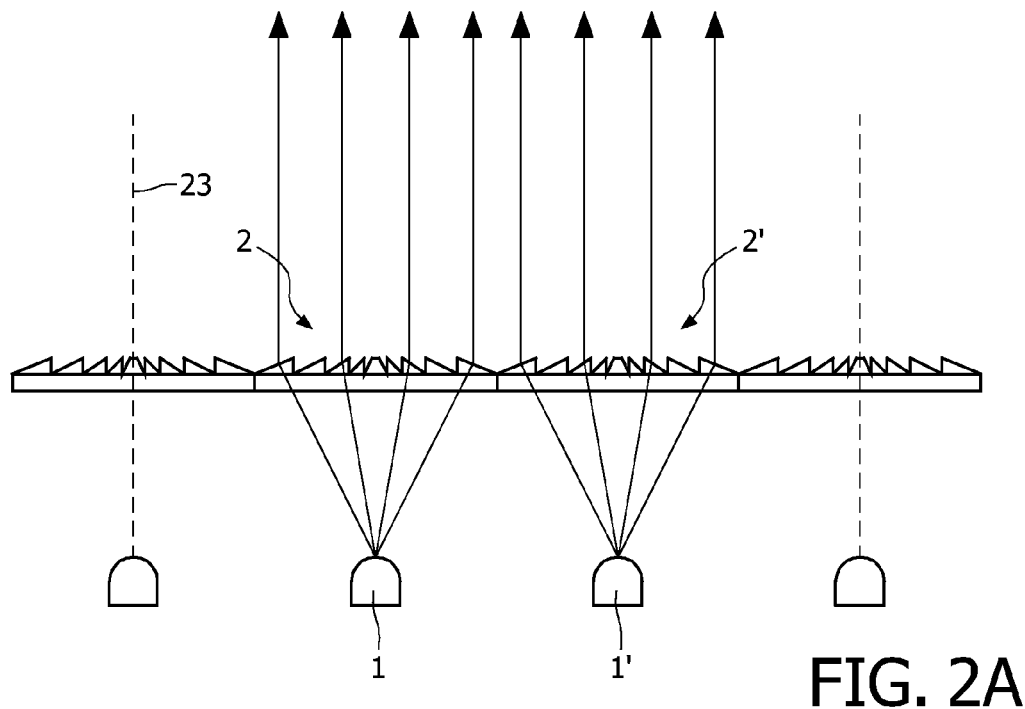
FIG. 2A is a side view of an embodiment of the illumination system according to the invention.

FIG. 2A is a side view of an embodiment of the illumination system according to the invention. Light beams emitted by the array of light emitters 1, 1', . . . arranged at a distance from the array of lenses 2, 2', . . . are shown. FIG. 2A shows the situation in which an optical axis 23 of the lenses 2, 2', . . . coincides with the light sources 1, 1', . . . . The resulting spot 30 on the projection plane 13 is shown in FIG. 3A.

Figure 2B:
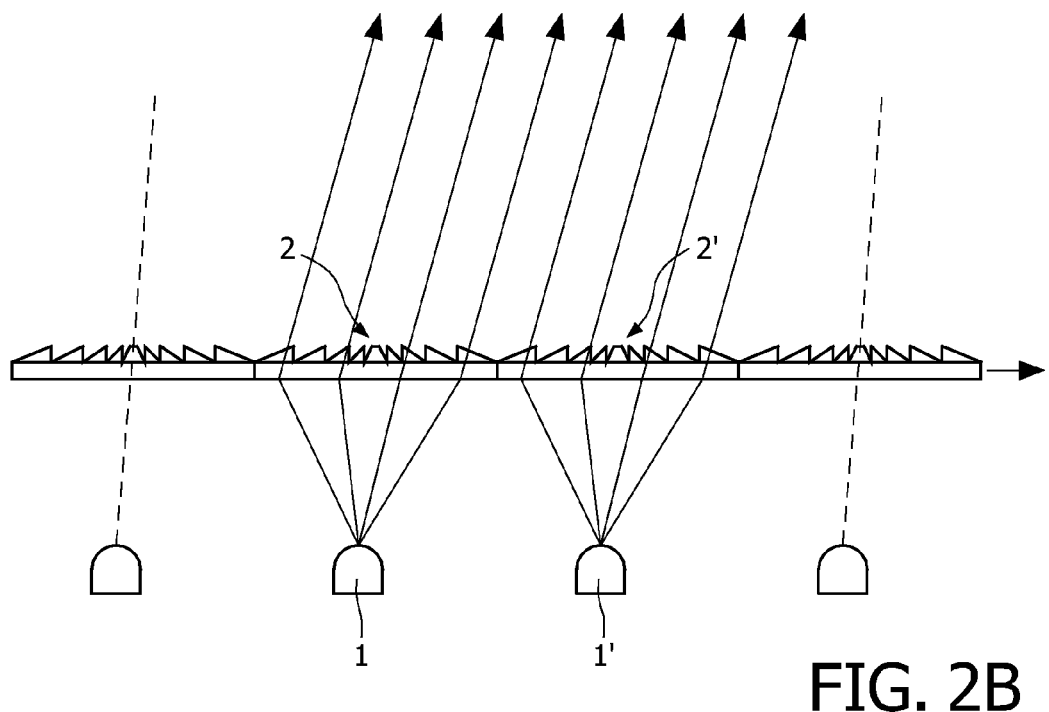
FIG. 2B is a side view of the embodiment of the illumination system as shown in FIG. 2A with the array of lenses in another position.

FIG. 2B is a side view of the embodiment of the illumination system as shown in FIG. 2A, in which the array of lenses 2, 2', . . . has been displaced along a translation direction with respect to the situation in FIG. 2A. The translational displacement is indicated by the arrow adjacent the array of lenses 2, 2', . . . . It is observed that the light beams emitted by the configuration shown in FIG. 2B are tilted with respect to the configuration in FIG. 2A. The resulting spot 30 on the projection plane 13 is shown in FIG. 3B. It is observed that the translational displacement of the array of lenses 2, 2', . . . results in the spot 30 in FIG. 3A so as to move in the same translational direction as is shown by spot 30 in FIG. 3B. The spot 30 is thus displaced to another position without tilting the illumination system.

Figure 3A:
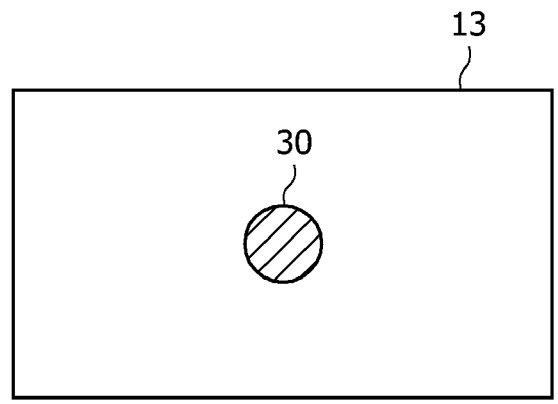
FIG. 3A shows a spot on a plane emitted by the illumination system as shown in FIG. 2A.
Figure 3B:
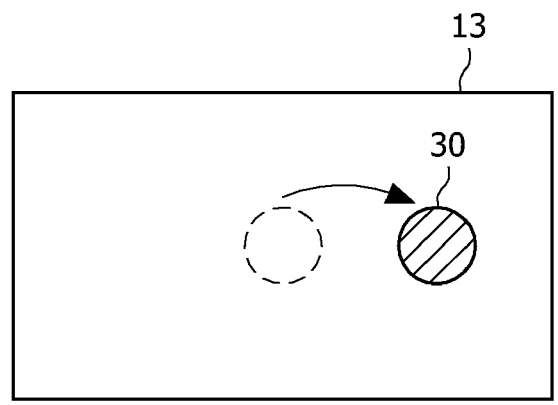
FIG. 3B shows a spot on a plane emitted by the illumination system as shown in FIG. 2B.
Figure 3C:
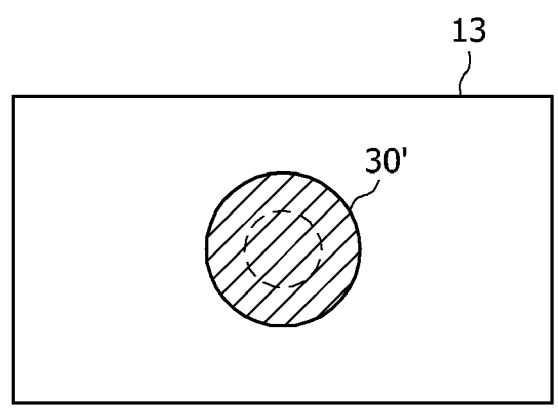
FIG. 3C shows a broadened spot on a plane emitted by the illumination system according to the invention.

FIG. 3A shows a spot 30 on a plane 13 emitted by the illumination system shown in FIG. 2A and as described hereinbefore. FIG. 3B shows a spot 30 on a plane 13 emitted by the illumination system shown in FIG. 2B, in which the array of lenses 2, 2', . . . has been displaced along a translational direction with respect to the situation in FIG. 2A. FIG. 3C shows a broadened spot 30' on a plane 13 emitted by the illumination system as shown in FIG. 1A, in which the array of lenses 2, 2', . . . has been rotationally displaced through a small angle.

Figure 4:
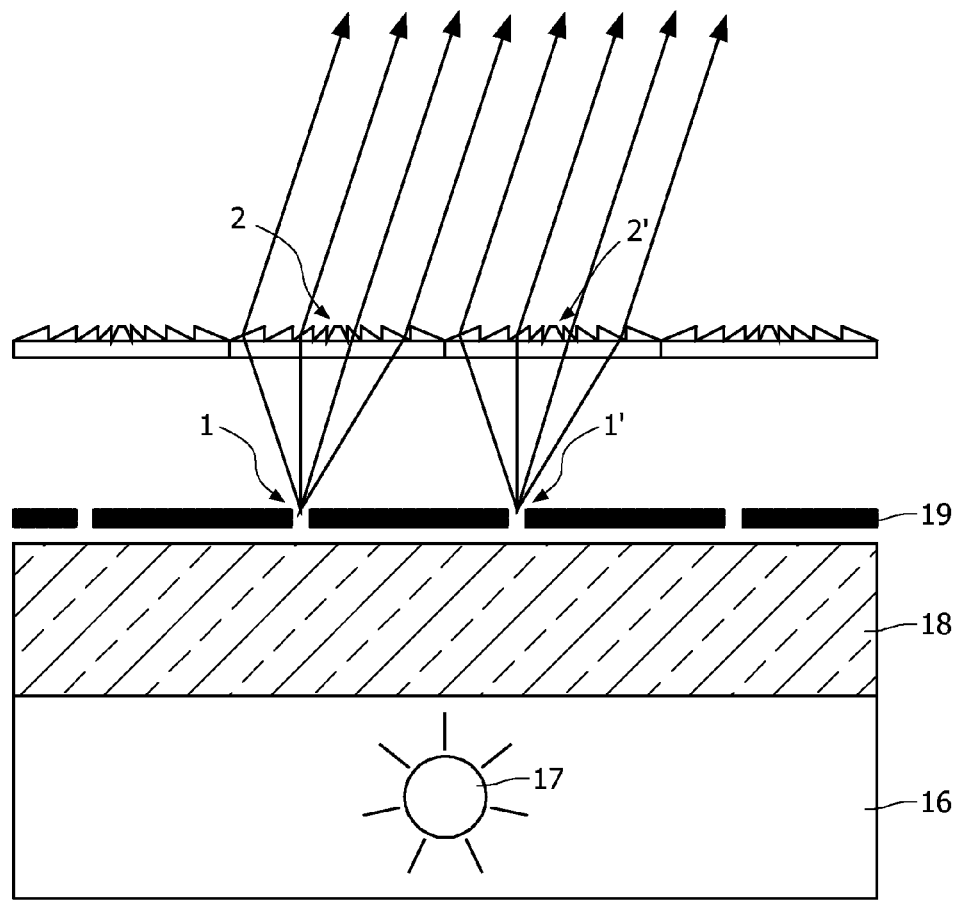
FIG. 4 is a cross-sectional view of another embodiment of the illumination system according to the invention.

FIG. 4 is a cross-sectional view of another embodiment of the illumination system according to the invention. In this embodiment, the illumination system comprises a housing 16 provided with a primary source of light 17. Light is coupled out from the illumination system via a light guide 18. A sheet 19 of black paper is placed on top of the light guide 18. The sheet is provided with small holes, the holes serving as (secondary) light sources 1, 1', . . . . A sheet comprising an array of lenses 2, 2', . . . is arranged above the (secondary) light sources 1, 1', . . . such that the light sources 1, 1', . . . are at the focal distance of the lenses 2, 2', . . . . In the example of FIG. 4, a sheet of Fresnel lenses is employed. In the example of FIG. 4, the light guide may be an overhead projector.

Figure 5:
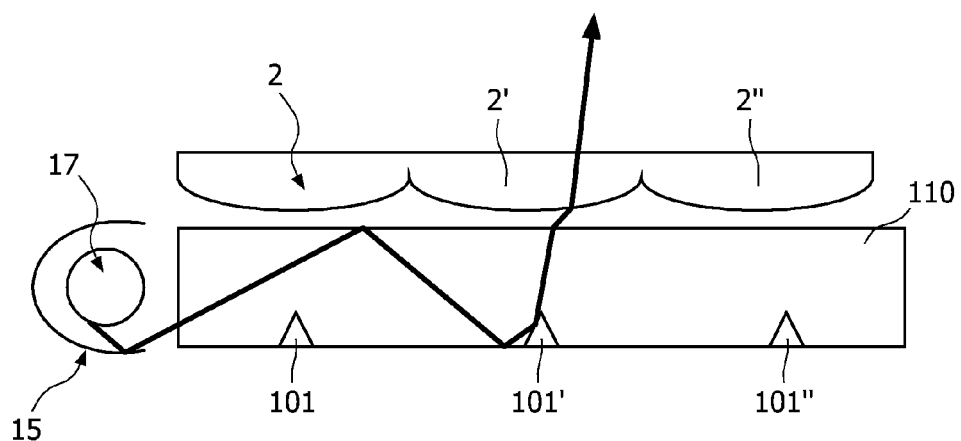
FIG. 5 is a cross-sectional view of yet another embodiment of the illumination system according to the invention.

FIG. 5 is a cross-sectional view of yet another embodiment of the illumination system according to the invention. For the sake of clarity, dimensions in FIG. 5 (particularly in the horizontal direction) have been strongly exaggerated. In this embodiment, the array of light sources comprises an array of light-outcoupling structures 101, 101', 101", . . . arranged in a light guide 110, the light guide 110 being associated with at least one primary source of light 17. In the example of FIG. 5, a reflector 15 is provided for guiding the light from the primary source of light 17 towards the light guide 110. In this embodiment, it is a sheet provided with mini-lenses 2, 2', 2" (approximately 3 mm in size). Such plates are commercially available (typically the plate is A4 size). The use of such small lenses has the advantage that displacement is also relatively small because the displacement is only a fraction of the lens diameter. Piezo-elements can be used if the lenses are sufficiently small.

In the configuration of FIG. 5, providing an individual "light source" for each lens with LEDs is virtual impossible. In the example of FIG. 5, a so-called side-lit plate with internal reflection and light-outcoupling structures 101, 101', 101", . . . at the appropriate position serve as an array of (secondary) light sources. A typical light beam emitted by the primary source of light 17 and coupled into the light guide 110 via the reflector 15 and coupled out of the light guide 110 via the light-outcoupling structure 101' and travelling via lens 2' is shown in FIG. 5. Examples of light-outcoupling structures 101, 101', 101", . . . are dots, indenting or protruding portions of, for example, pyramidal shape, or slits, holographic, diffractive or any other light-outcoupling means. The light-outcoupling structures 101, 101', 101", . . . are preferably patterned, non-scattering and/or reflect predominantly specularly or exhibit a so-called non-Lambertian reflection.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. Use of the article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
   an array of light sources arranged in a pre-determined manner in a first plane wherein $d_{source}$ is a characteristic dimension of the spatial arrangement of the light sources in the first plane representing the distance between adjacent light sources,
   an array of associated lenses arranged in substantially the same pre-determined manner in a second plane, each lens having substantially the same focal distance $f_{lens}$ and having a distance between a centerpoint of each of said associated lenses of $d_{lens}$, said array of light sources and said array of lenses rotatably mounted relative to each other;
   the second plane being arranged substantially parallel to the first plane,
   the array of lenses being provided at a plane distance $d_{plane}$ from the array of light sources, the plane distance $d_{plane}$ being substantially equal to the focal distance $f_{lens}$ of the lenses,
   said rotatable mounting of said plurality of lenses and said plurality of light sources relative to each other sufficient for displacing the array of lenses with respect to the array of light sources parallel to the first plane so as to obtain a plurality of directional light beams projecting spots on a projection plane arranged at a projection distance $d_{projection}$ from the illumination system, wherein $d_{projection} \geq 10 \times d_{source}$ and $d_{projection} \geq 10 \times d_{plane}$, wherein $d_{lens} < d_{source}$, wherein $d_{lens}$ is a characteristic dimension of the spatial arrangement of the lenses;
   wherein said dimension $d_{lens} < d_{source}$, causes said plurality of directed light beams to overlap to form a single spot when said array of lenses are in a first rotational position relative to said array of light sources;
   a rotatable mount positioning said array of lenses and said array of light sources in a second rotational position repositioning said single spot without tilting said illumination system and maintaining substantially the same distance of said $d_{plane}$;
   said rotatable mount positioning said array of lenses and said array of light sources in a third rotational position creating a broadened spot relative to said single spot wherein said plurality of directional beams overlap.

2. The illumination system as claimed in claim 1, wherein the ratio of the characteristic dimension of the spatial arrangement of the light sources in the first plane and the characteristic dimension of the spatial arrangement of the lenses in the second plane meets the relation:

$$d_{source} = d_{lens} \times \left(1 + \frac{d_{plane}}{d_{projection}}\right).$$

3. The illumination system as claimed in claim 2, wherein the light sources and the lenses are arranged in a hexagonal structure.

4. The illumination system as claimed in claim 1, wherein said rotatable mount of said array of lenses relative to said array of light sources is constructed for translational displacement of the array of lenses so as to obtain a joint translational displacement of the spots.

5. The illumination system as claimed in claim 4, wherein the translational displacement comprises a position in which a lens optical axis of at least one of the lenses coincides with a source optical axis of at least one of the light sources so as to obtain substantially coinciding spots on the projection plane,
   the translational displacement of the array of lenses causing a corresponding displacement of the coinciding spots, and
   the lens optical axis and the source optical axis being perpendicular to the second and the first plane, respectively.

6. The illumination system as claimed in claim 1, wherein said rotatable mount is constructed for rotational displacement of the array of lenses so as to obtain a rotational displacement of the spots, the angles of the light beams with respect to an axis perpendicular to the second plane changing upon rotation.

7. The illumination system as claimed in claim 1, wherein the array of lenses comprises an array of Fresnel lenses.

8. The illumination system as claimed in claim 1, wherein the array of light sources comprises an array of light-emitting diodes.

9. The illumination system as claimed in claim 8, wherein the array of light-emitting diodes comprises a plurality of light-emitting diodes of different primary colors.

10. The illumination system as claimed in claim 1, wherein the array of light sources comprises an array of light-outcoupling structures arranged in a light guide, the light guide being provided with at least one primary source of light.

11. An illumination system comprising:
    a plurality of light sources arranged in a first plane and a plurality of associated lenses arranged in a second plane, said first plane and said second plane substantially parallel, said plurality of light sources rotatably mounted relative to said plurality of lenses while maintaining substantially the same distance between said light sources and said lenses;
    wherein said plurality of light sources are in a spatial arrangement $d_{source}$ in said first plane representing the distance between adjacent light sources,
    the plurality of lenses being positioned on said plane a distance $d_{plane}$ from said plurality of light sources,
    wherein said plane distance $d_{plane}$ substantially equal to a focal distance $f_{lens}$ of said plurality of lenses and wherein $d_{lens}$ is a dimension of the spatial separation arrangement of said plurality of lenses and the centerpoint of each of said plurality of lenses;
    said rotatable mounting of said lenses and said light sources relative to each other sufficient for displacing the array of lenses with respect to the array of light sources parallel to the first plane so as to obtain a plurality of directional light beams projecting spots on a projection plane arranged at a projection distance $d_{projection}$ from said second plane, wherein $d_{projection} \geq 10 \times d_{source}$ and $d_{projection} \geq 10 \times d_{plane}$, wherein $d_{lens} < d_{source}$,
    wherein said $d_{lens} < d_{source}$, causes said plurality of directed light beams to overlap to form a single spot when said array of lenses are in a first rotational position relative to said array of light sources;
    said rotatable mount positioning said array of lenses and said array of light sources in a second rotational position repositioning said single spot without tilting said illumination system;
    said rotatable mount positioning said array of lenses and said array of light sources in a third rotational position creating a broadened spot relative to said single spot wherein said plurality of directional beams overlap.

* * * * *